Patented June 19, 1934

1,963,251

UNITED STATES PATENT OFFICE 1,963,251

ARTICLE COMPRISING ORGANIC ESTERS OF CELLULOSE

George Schneider, Montclair, N. J., assignor to Celanese Corporation of America, a corporation of Delaware No Drawing. Application April 29, 1931,
Serial No. 533,797

7 Claims. (Cl. 106—40)

This invention relates to the preparation of articles whose outer surfaces are resistant to water and other liquids and which have other desirable properties.

An object of my invention is to prepare articles, at least the outer surface of which contains cellulose acetate or other organic esters of cellulose of high degree of esterification, whereby desirable properties including resistance to water and other liquids are attained. Other objects of this invention will appear from the following detailed description.

The cellulose acetate ordinarily used for commercial purposes is not a fully acetylated cellulose corresponding to cellulose triacetate, but usually has an acetyl value of less than 55% (determined as acetic acid). While such cellulose acetate has many desirable properties, its resistance to water is not as great as may be desired. Thus when films made from such cellulose acetate are subjected to prolonged contact with water, they tend to curl or crinkle. Likewise thin foils of such a cellulose acetate are more or less permeable to water.

I have found that cellulose acetates or other organic esters of cellulose of high degree of esterification are more resistant to the action of water and certain other liquids than the ordinary cellulose acetate, and may be used to make various articles where such resistance is desired. Moreover I have found that for certain other purposes, such highly esterified cellulose products are desirable.

In accordance with my invention, I prepare articles, at least the outer surface of which contains an organic ester of cellulose of high degree of esterification.

While this invention will be described specifically in connection with cellulose acetate, it is also applicable to other organic esters of cellulose such as cellulose formate, cellulose propionate and cellulose butyrate. Preferably I use a cellulose acetate of a high acetyl content, of above 57% (determined as acetic acid), say from 58 to 62% or more.

The cellulose acetate of high acetyl value may be made in any suitable manner. For instance the primary solution of cellulose acetate formed by acetylating cellulose with acetic anhydride and sulfuric acid in the presence of acetic acid may be subjected to a hydrolyzing or ripening action, and the ripening interrupted at such a point that the finished product contains the desired high acetyl value. If desired the primary cellulose acetate may be precipitated directly by the addition of a large amount of water to the primary solution. A fully acetylated cellulose acetate or one of somewhat lower degree of acetylation, formed either by acetylizing cellulose in the presence of a non-solvent such as benzol so that the cellulose is formed in suspension, or formed by precipitating the cellulose acetate from its solution when it is made by the solution method, may be digested at temperatures above the boiling point of water at elevated pressure with water or aqueous liquids.

Another way of making the cellulose acetate of high acetyl value is to subject a cellulose acetate of lower degree of esterification, such as an acetone-soluble cellulose of say 54 to 55% acetyl value, to re-acetylation by means of acetic anhydride in the presence of a catalyst.

The cellulose acetate of high acetyl value may be used for many purposes in accordance with my invention.

In one form of my invention, photographic films, such as cinematographic, X-ray or ordinary films may be made. Films made from ordinary cellulose acetate tend to curl or crinkle when treated with the aqueous solutions used for developing, fixing and washing. However, if film base is made by casting a solution of a cellulose acetate of high acetyl value containing plasticizers and other ingredients in any suitable manner, and the film base so formed is coated with photographic emulsion, the resulting product does not tend to curl or crinkle when developed, fixed and washed or exposed to moist conditions. Indeed film base made in accordance with this invention may be treated with boiling water for over 2 hours without crinkling appreciably, and without becoming delustred.

In another form of this invention, thin foils or transparent paper may be made from the cellulose acetate of high acetyl value with or without plasticizers, and such thin foils may be employed for wrapping various articles. Such thin foils are quite impermeable to moisture and thus protect the wrapped contents.

Celluloid-like articles of various shapes and sizes may be made by working up plastic compositions containing the cellulose acetate of high acetyl value and plasticizers in any known or suitable manner. Such articles do not stain when alcohol and the like is brought into contact therewith.

Phonograph records for the mechanical reproduction of sound may be made, which consist wholly of a plastic composition containing the cellulose acetate of high acetyl value. If desired the outer surface containing the sound tracks alone may consist of such plastic composition containing the high acetyl cellulose acetate and the interior may be made of paper or any plastic composition. Preferably no plasticizers or little plasticizers, say less than 10% of the weight of the cellulose acetate, is employed, but more plasticizers together with pigments or filling materials may also be used. Phonograph records whose sound tracks contain the high acetyl cellulose have high reproducing efficiency and reproduce sound of clear tone.

In still another aspect of this invention, a solution containing the cellulose acetate of high acetyl value with or without plasticizers and other ingredients may be made to coat articles of various kinds. Thus thin foil made of ordinary cellulose acetate of lower acetyl value, or of reconstituted cellulose may be coated with a solution of the cellulose acetate of high acetyl value to obtain greater impermeability to moisture. Articles made of plastic compositions containing cellulose nitrate or ordinary organic derivatives of cellulose may be coated with a solution of the high acetyl cellulose acetate to protect them against the deleterious action of alcoholic solutions and the like. Articles of metal, wood and the like which are coated with a lacquer of cellulose nitrate or any other coating composition, may have applied thereto as a final coat a solution of the high acetyl cellulose acetate.

In working up the cellulose acetate of high acetyl value, suitable volatile solvents such as methylene chloride, a mixture of chloroform with ethyl alcohol or methyl alcohol, a mixture of methylene chloride and ethyl or methyl alcohol, or a mixture of ethylene dichloride and ethyl or methyl chloride may be used. Examples of suitable plasticizers or modifers that may be used when required are dibutyl tartrate, dimethyl phthalate, diethyl phthalate, ortho- and para-ethyl toluene sulfonamid, triphenyl phosphate, triacetin, etc., the amounts employed being varied to obtain the desired effects as is well understood in the art.

The foregoing description is given merely by way of illustration and many variations may be made therein, without departing from the spirit of my invention.

Having described my invention, what I desire to secure by Letters Patent is:

1. An article of manufacture, at least the outer surface of which comprises cellulose acetate having an acetyl value above 57% (determined as acetic acid).

2. An article of manufacture comprising a cellulose acetate having an acetyl value above 57% (determined as acetic acid).

3. Sheet-like material resistant to water made of a composition containing a cellulose acetate of acetyl value above 57% (determined as acetic acid).

4. Photographic film base resistant to water made of a composition containing a cellulose acetate of acetyl value above 57% (determined as acetic acid).

5. Thin foil resistant to water made of a composition containing a cellulose acetate of acetyl value above 57% (determined as acetic acid).

6. A phonograph record having a sound track made of a composition containing a cellulose acetate of acetyl value above 57% (determined as acetic acid).

7. Articles coated with a film of a composition containing a cellulose acetate of acetyl value above 57% (determined as acetic acid).

GEORGE SCHNEIDER.